(12) United States Patent
Mouri et al.

(10) Patent No.: US 12,024,087 B2
(45) Date of Patent: Jul. 2, 2024

(54) VEHICLE INDICATION DEVICE

(71) Applicants: TOYOTA JIDOSHA KABUSHIKI KAISHA, Aichi-ken (JP); ICHIKOH INDUSTRIES, LTD., Kanagawa-ken (JP)

(72) Inventors: Fumihiko Mouri, Owariasahi (JP); Harumi Mochimaru, Isehara (JP); Yasufumi Suzuki, Isehara (JP)

(73) Assignees: TOYOTA JIDOSHA KABUSHIKI KAISHA, Aichi-Ken (JP); ICHIKOH INDUSTRIES, LTD., Kanagawa-Ken (JP)

( * ) Notice: Subject to any disclaimer, the term of this patent is extended or adjusted under 35 U.S.C. 154(b) by 0 days.

(21) Appl. No.: 17/956,832

(22) Filed: Sep. 30, 2022

(65) Prior Publication Data

US 2023/0107328 A1 Apr. 6, 2023

(30) Foreign Application Priority Data

Oct. 5, 2021 (JP) ................................. 2021-164245

(51) Int. Cl.
*B60Q 1/44* (2006.01)
(52) U.S. Cl.
CPC ............. *B60Q 1/442* (2013.01); *B60Q 1/444* (2013.01); *B60Q 2400/50* (2013.01)
(58) Field of Classification Search
CPC .... B60Q 1/442; B60Q 1/444; B60Q 2400/50; B60Q 1/38; B60Q 1/547
See application file for complete search history.

(56) References Cited

U.S. PATENT DOCUMENTS

| 8,954,252 | B1 * | 2/2015 | Urmson | G08G 1/167 |
| | | | | 701/301 |
| 10,261,513 | B2 * | 4/2019 | Reiley | B60Q 1/5037 |
| 10,457,199 | B2 * | 10/2019 | Kunii | B60Q 1/50 |
| 10,706,719 | B2 * | 7/2020 | Zhang | G03B 29/00 |
| 11,440,469 | B2 * | 9/2022 | Ahn | B60Q 1/085 |
| 2015/0194053 | A1 * | 7/2015 | Jensen | B60Q 1/442 |
| | | | | 340/944 |
| 2017/0240096 | A1 * | 8/2017 | Ross | G05D 1/0212 |

(Continued)

FOREIGN PATENT DOCUMENTS

| EP | 3401161 A2 | 11/2018 |
| EP | 3858672 A1 | 8/2021 |

(Continued)

*Primary Examiner* — Nay Tun
(74) *Attorney, Agent, or Firm* — HAUPTMAN HAM, LLP

(57) ABSTRACT

A vehicle indication device includes: a road surface drawing unit mounted on a vehicle and configured to draw one or more notification indications by light on a road surface in a direction of travel of the vehicle; and a control unit configured to, when a turn signal of the vehicle is on, cause the road surface drawing unit to either draw the one or more notification indications in a first color on the road surface or turn off display of the one or more notification indications in a case where the vehicle gives way to a pedestrian, and cause the road surface drawing unit to draw the one or more notification indications in a second color different from the first color on the road surface in a case different from the case where the vehicle gives way to a pedestrian.

13 Claims, 6 Drawing Sheets

(56) References Cited

U.S. PATENT DOCUMENTS

| | | | |
|---|---|---|---|
| 2017/0259728 A1* | 9/2017 | Nagata | B60Q 1/085 |
| 2017/0267167 A1* | 9/2017 | Sakata | B60Q 1/247 |
| 2018/0072218 A1* | 3/2018 | Sweeney | B60Q 1/545 |
| 2018/0118099 A1* | 5/2018 | Kunii | H04N 9/3194 |
| 2018/0319325 A1* | 11/2018 | Tatara | B60Q 1/2696 |
| 2019/0077304 A1 | 3/2019 | Nakashima et al. | |

FOREIGN PATENT DOCUMENTS

| | | |
|---|---|---|
| JP | WO2016027314 A1 | 4/2017 |
| JP | 2018192836 A | 12/2018 |
| JP | 201948525 A | 3/2019 |
| JP | 202055519 A | 4/2020 |

* cited by examiner

VEHICLE INDICATION DEVICE

CROSS-REFERENCE TO RELATED APPLICATION

This application claims priority to Japanese Patent Application No. 2021-164245 filed on Oct. 5, 2021, incorporated herein by reference in its entirety.

BACKGROUND

1. Technical Field

The present disclosure relates to vehicle indication devices that draw a notification indication on a road surface in the direction of travel of a vehicle by light.

2. Description of Related Art

Vehicle indication devices that draw a notification indication on a road surface in the direction of travel of a vehicle by light are known in the art.

Japanese Unexamined Patent Application Publication No. 2020-55519 (JP 2020-55519 A) describes a device that draws on a road surface a start-to-move notification indication indicating that a vehicle starts to move, when a brake of the vehicle is switched from on to off.

SUMMARY

The device described in JP 2020-55519 A merely draws a notification indication indicating that the vehicle starts to move, and cannot notify a pedestrian of the timing the vehicle moves and turns right or left when the vehicle is about to make a right or left turn.

In the present disclosure, a pedestrian is notified of the timing a vehicle moves and turns right or left when the vehicle is about to make a right or left turn.

A vehicle indication device according to one aspect of the present disclosure includes: a road surface drawing unit mounted on a vehicle and configured to draw one or more notification indications by light on a road surface in a direction of travel of the vehicle; and a control unit configured to, when a turn signal of the vehicle is on, cause the road surface drawing unit to either draw the one or more notification indications in a first color on the road surface or turn off display of the one or more notification indications in a case where the vehicle gives way to a pedestrian, and cause the road surface drawing unit to draw the one or more notification indications in a second color different from the first color on the road surface in a case different from the case where the vehicle gives way to a pedestrian.

According to the above configuration, when the turn signal of the vehicle is on, that is, when the vehicle is about to make a right or left turn, a pedestrian can be notified of the timing the vehicle moves and turns right or left by the difference in color of the notification indication. The pedestrian can also be notified of the driver's decision on whether to give way to the pedestrian.

In the vehicle indication device according to the above aspect, the case where the vehicle gives way to a pedestrian may be a case where: (i) the control unit is aware based on location information of the vehicle that the vehicle is passing through an intersection, is aware from a camera mounted on the vehicle that the vehicle is approaching a crosswalk, or is aware from the camera that there is a pedestrian in front of the vehicle, (ii) a brake of the vehicle is on, and (iii) the control unit predicts that the vehicle is going to stop in front of the crosswalk. According to this configuration, the control of drawing the notification indication can be performed in a different manner depending on whether the vehicle is going to stop in front of the crosswalk.

In the vehicle indication device according to the above aspect, in the case different from the case where the vehicle gives way to a pedestrian, a plurality of the notification indications may be provided as the one or more notification indications, and the control unit may be configured to cause the road surface drawing unit to draw the notification indications in sequence. According to this configuration, the pedestrian can be more clearly notified of the direction in which the vehicle travels.

In the vehicle indication device according to the above aspect, the control unit may further be configured to cause the road surface drawing unit to draw a travel area where the vehicle is going to travel, the travel area having a width equal to a width of the vehicle. According to this configuration, the pedestrian can be more clearly notified of the travel area where the vehicle is going to travel.

In the vehicle indication device according to the above aspect, the control unit may further be configured to cause the road surface drawing unit to draw a non-travel area where the vehicle is not going to travel, the non-travel area being drawn outside the travel area, and the travel area and the non-travel area may be drawn in different colors. According to this configuration, the pedestrian can be notified of the travel area where the vehicle is going to travel and the non-travel area where the vehicle is not going to travel by the difference in color.

In the vehicle indication device according to the above aspect, the control unit may be configured to change a range in which the one or more notification indications is drawn according to a speed of the vehicle.

Alternatively, in the vehicle indication device according to the above aspect, the control unit may be configured to change a range in which the (plurality of) notification indications are drawn according to a speed of the vehicle.

The vehicle indication device according to the present disclosure can notify a pedestrian of the timing a vehicle moves and turns right or left when the vehicle is about to make a right or left turn.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
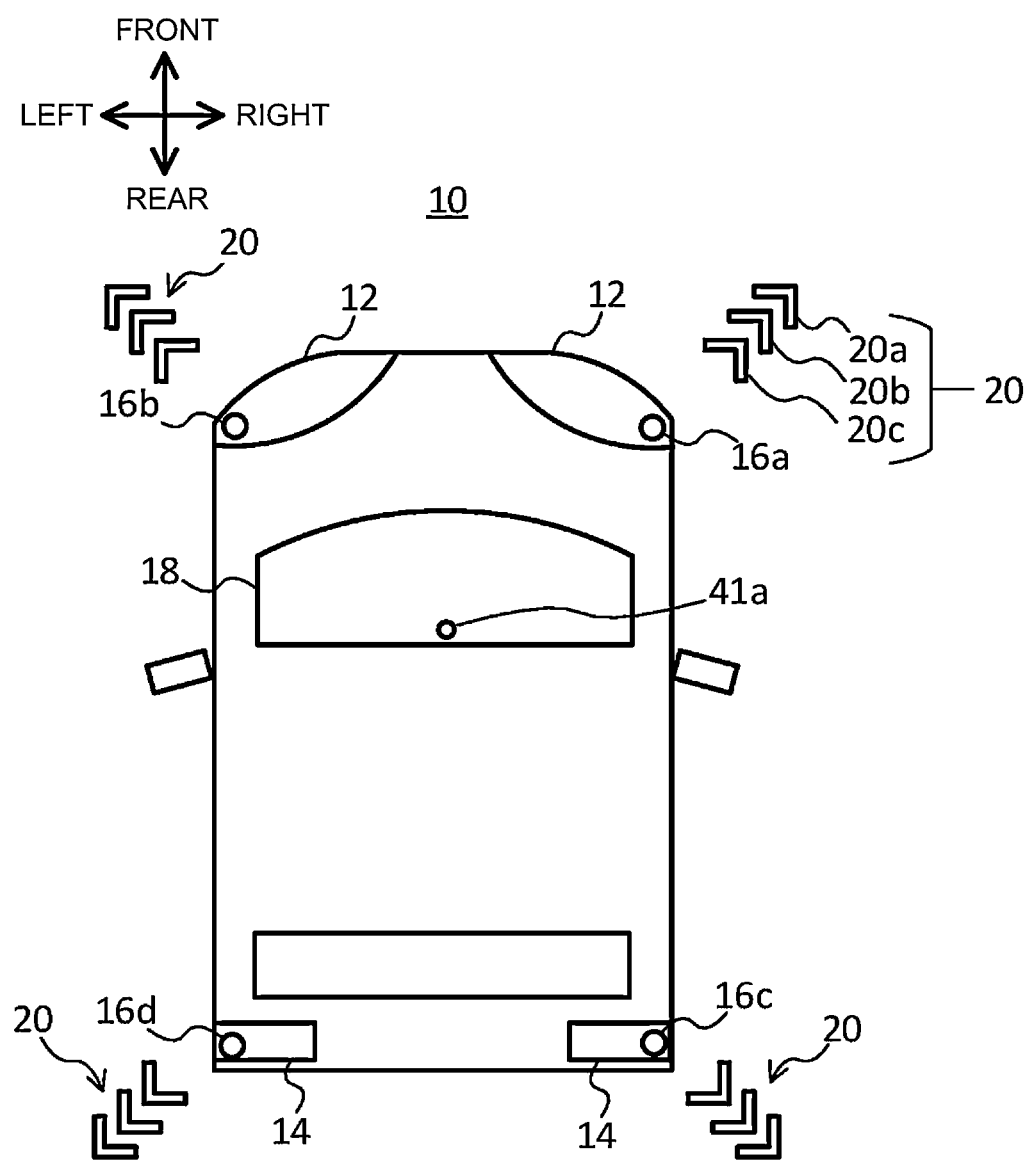
FIG. 1 shows notification indications in the right and left directions of a vehicle when the vehicle is viewed from above.

A vehicle 10 equipped with a vehicle indication device according to an embodiment will be described with reference to FIG. 1. FIG. 1 shows the vehicle 10 as viewed from above. The vehicle 10 is an automobile.

A pair of right and left headlights 12 is mounted on the front part of the vehicle 10, and a pair of right and left rear combination lamps 14 is mounted on the rear part of the vehicle 10.

The right headlight 12 is provided with a vehicle indication device 16a that emits light on the road surface on the front right side of the vehicle 10. The left headlight 12 is provided with a vehicle indication device 16b that emits light on the road surface on the front left side of the vehicle 10.

The right rear combination lamp 14 is provided with a vehicle indication device 16c that emits light on the road surface on the rear right side of the vehicle 10. The left rear combination lamp 14 is provided with a vehicle indication device 16d that emits light on the road surface on the rear left side of the vehicle 10.

The rear combination lamps 14 may not be provided with the vehicle indication device 16. A vehicle indication device 16 may be mounted in the middle of the front part of the vehicle 10 so that the direction in which light is emitted can be switched to the right or the left. The same applies to the rear part of the vehicle 10.

The vehicle indication device 16 draws a notification indication 20 on the road surface by emitting light on the road surface. The notification indication 20 is composed of, for example, markings 20a, 20b, and 20c arranged in a row. Each of the markings 20a, 20b, and 20c has the shape of an arrow tip. The arrow tips of the notification indication 20 that is drawn on the road surface in front of the vehicle 10 point to the right or left in front of the vehicle 10, and the arrow tips of the notification indication 20 that is drawn on the road surface behind the vehicle 10 point to the right or left behind the vehicle 10. The shape of each marking shown in FIG. 1 is merely by way of example, and each marking may have a shape other than the shape shown in the figure. The number of markings is also merely by way of example, and the notification indication 20 need only be composed of one or more markings. The vehicle indication device 16 may turn on all the markings 20a, 20b, and 20c at the same time, may turn on a part of the markings 20a, 20b, and 20c at the same time, or may provide "sequential lighting" in which the markings 20a, 20b, and 20c are turned on in sequence.

Figure 2:
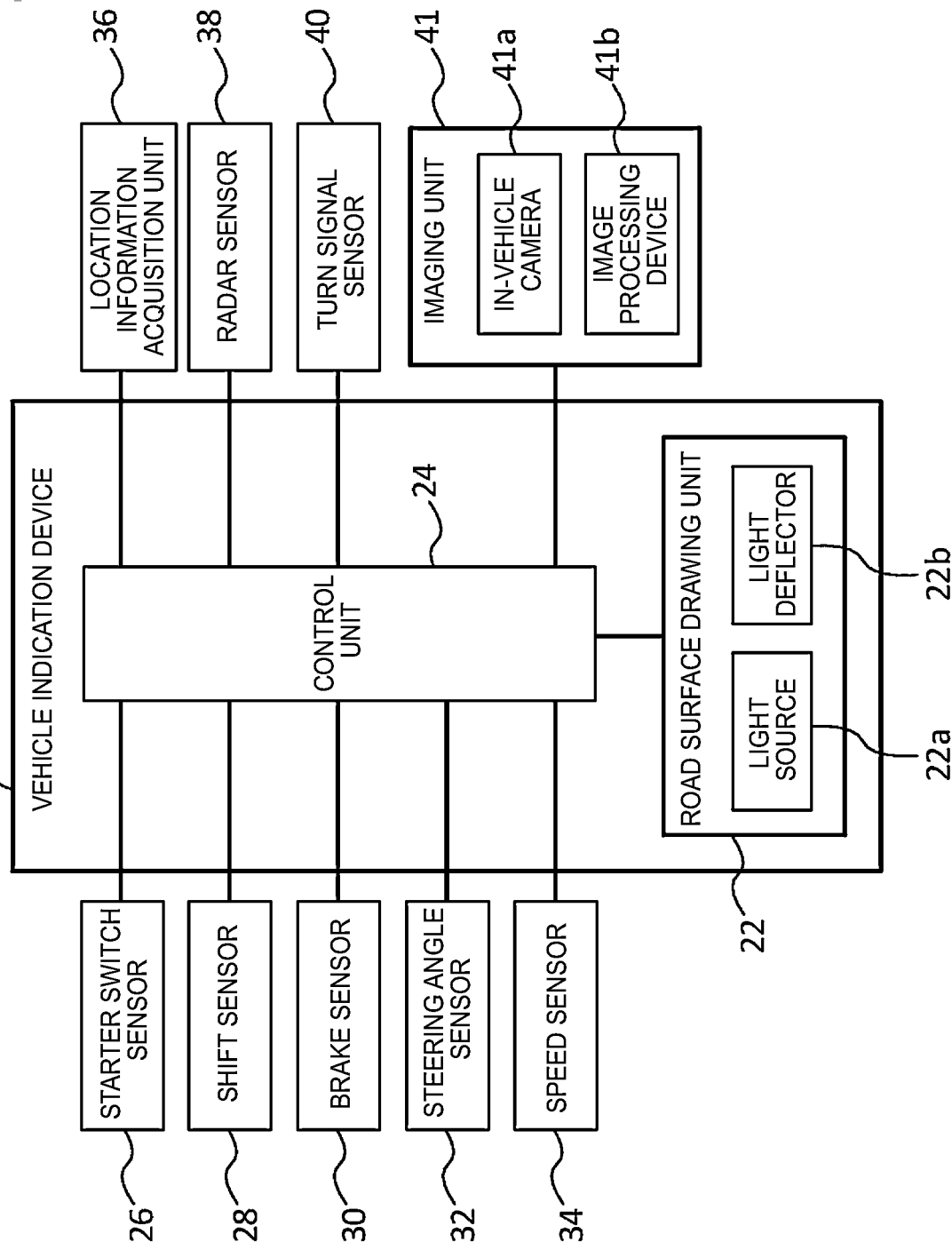
FIG. 2 is a block diagram of a vehicle indication device.

The vehicle indication devices 16a, 16b, 16c, and 16d are herein sometimes collectively referred to as the vehicle indication device 16. The configuration of the vehicle indication device 16 will be described with reference to FIG. 2. FIG. 2 is a block diagram showing the configuration of the vehicle indication device 16.

The vehicle indication device 16 includes a road surface drawing unit 22 and a control unit 24. A starter switch sensor 26, a shift sensor 28, a brake sensor 30, a steering angle sensor 32, a speed sensor 34, a location information acquisition unit 36, a radar sensor 38, a turn signal sensor 40, and an imaging unit 41 are mounted on the vehicle 10 and output signals to the control unit 24.

The road surface drawing unit 22 includes a light source 22a and a light deflector 22b, and draws a notification indication 20 on the road surface by emitting light from the light source 22a to the road surface. The road surface drawing unit 22 can change the brightness, color, and shape of the light that is emitted and the position and range where the light is emitted.

The light source 22a employs, for example, a semiconductor light-emitting element such as an a light emitting diode (LED), a laser diode (LD), or an electroluminescence (EL) element, a light bulb, a halogen lamp, or an incandescent lamp.

The light deflector 22b directs light from the light source 22a to the outside of the vehicle indication device 16. The light deflector 22b employs, for example, a Digital Mirror Device (DMD) that is an example of a micromirror device, or Digital Light Processing (DLP) (registered trademark). For example, the light deflector 22b includes a micromirror array in which a plurality of very small mirror elements each having a reflective surface on its surface is arranged in a matrix. The micromirror array can form various light distribution patterns by controlling on and off of the mirror elements arranged in a matrix.

A light source unit of three or more colors such as red, green, and blue may be employed as the light source 22a. Light of a desired color may be produced by emitting light from the light source 22a to the light deflector 22b in a time-divided manner and switching on and off the mirror elements. A notification indication 20 having desired brightness and color and having a desired shape formed by a collection of light beams emitted in a matrix can be drawn on the road surface.

The light deflector 22b may employ an optical micro-electro-mechanical system (optical MEMS), a polygon mirror, etc., instead of the DMD.

The road surface drawing unit 22 is configured to swing by a motor etc. The road surface drawing unit 22 of the vehicle indication device 16 included in the headlight 12 is controlled by the control unit 24 to tilt up, down, to the right, or to the left, so that the direction in which light is emitted to the road surface can be switched to the direction forward or obliquely forward of the vehicle 10. The road surface drawing unit 22 of the vehicle indication device 16 included in the rear combination lamp 14 is controlled by the control unit 24 to tilt up, down, to the right, or to the left, so that the direction in which light is emitted to the road surface can be switched to the direction rearward or obliquely rearward of the vehicle 10.

The control unit 24 determines whether it is necessary to draw a notification indication 20, based on the output from at least one of the following components: the starter switch sensor 26, the shift sensor 28, the brake sensor 30, the steering angle sensor 32, the speed sensor 34, the location information acquisition unit 36, the radar sensor 38, the turn signal sensor 40, and the imaging unit 41. When it is necessary to draw a notification indication 20, the control unit 24 causes the road surface drawing unit 22 to draw a notification indication 20 on the road surface. When it is not necessary to draw a notification indication 20, the control unit 24 does not cause the road surface drawing unit 22 to draw a notification indication 20 on the road surface.

The starter switch sensor 26 detects whether a starter switch (e.g., an ignition switch or a start switch) of the vehicle 10 is on or off, and outputs the detection result to the control unit 24.

The shift sensor 28 detects the position of a shift lever of the vehicle 10, such as a forward drive position (drive (D)

position), a reverse drive position (reverse (R) position), or a parking (P) position, and outputs the detection result to the control unit 24.

The brake sensor 30 detects whether a brake of the vehicle 10 (e.g., a foot brake, a hand brake, or an automatic brake in an autonomous driving system) is on (braking state) or off (released state), and outputs the detection result to the control unit 24.

The steering angle sensor 32 detects whether the vehicle 10 is moving straight, is steering to the right, or is steering to the left, and outputs the detection result to the control unit 24. For example, a reference steering angle of a steering wheel of the vehicle 10 is set to the steering angle when the vehicle 10 is moving straight, and a steering angle of the steering wheel when steered in a right turn direction is defined as a positive steering angle, and a steering angle of the steering wheel when steered in a left turn direction is defined as a negative steering angle. The steering angle sensor 32 detects a positive steering angle as the vehicle 10 steering to the right, and detects a negative steering angle as the vehicle 10 steering to the left.

The speed sensor 34 detects the speed of the vehicle 10 and outputs the detection result to the control unit 24. The speed sensor 34 also detects the acceleration of the vehicle 10 (e.g., acceleration G during acceleration, deceleration G during deceleration), and outputs the detection result to the control unit 24.

The location information acquisition unit 36 acquires location information of the vehicle 10 by using a satellite positioning system such as Global Navigation Satellite System (GNSS) or Global Positioning System (GPS), and outputs the location information to the control unit 24. The location information acquisition unit 36 may acquire, for example, map information, information indicating road conditions (e.g., traffic congestions), and location information of other vehicles via a communication path such as the Internet. The location information acquisition unit 36 may acquire, for example, information on a traffic congestion at the current location indicated by the current location information of the vehicle 10 and information on a traffic light installed at an intersection the vehicle 10 is going to reach (e.g., a traffic light meaning "stop" such as red light) by using a road information communication system. The road information communication system is, for example, the Vehicle Information and Communication System (VICS) (registered trademark).

The radar sensor 38 is a microwave radar sensor, a millimeter wave radar sensor, etc. The radar sensor 38 detects, for example, an object existing in front of the vehicle 10 (e.g., other vehicle, a person, an animal, or other obstacle), and outputs the detection result to the control unit 24. The radar sensor 38 may detect an object existing on the side of the vehicle 10 or behind the vehicle 10 and output the detection result to the control unit 24.

The turn signal sensor 40 detects whether a turn signal switch mounted on the vehicle 10 is on or off, and outputs the detection result to the control unit 24.

The imaging unit 41 includes an in-vehicle camera 41a and an image processing device 41b, and generates an image (e.g., a moving image or a still image) by capturing with the in-vehicle camera 41a.

As shown in FIG. 1, the in-vehicle camera 41a is mounted on, for example, the upper part of a windshield 18, and captures an image of the area in front of the vehicle 10. This mounting position of the in-vehicle camera 41a is merely by way of example, and the in-vehicle camera 41a may be a built-in camera of the headlight 12, or may be mounted on the rooftop, hood, side-view mirror, etc. of the vehicle 10. An in-vehicle camera that captures an image of the area on the side of the vehicle 10 and an in-vehicle camera that captures an image of the area behind the vehicle 10 may be provided on the rooftop, hood, side-view mirror, etc. of the vehicle 10. The rear combination lamps 14 may be provided with an in-vehicle camera.

The image processing device 41b analyzes the image generated by capturing with the in-vehicle camera, and outputs the analysis result to the control unit 24. For example, the image processing device 41b detects an object shown in the image (e.g., other vehicle, a person, an animal, a sign, or other obstacle) by analyzing the image, and outputs the detection result to the control unit 24.

The control unit 24 may acquire an image generated by capturing with a road surveillance camera via a communication path such as the Internet.

Next, the operation of the vehicle indication device 16 will be described.

When a turn signal of the vehicle 10 is on, the control unit 24 causes the road surface drawing unit 22 to either draw a notification indication 20 in a safety color on the road surface or turn off display of a notification indication 20 in the case where the vehicle 10 gives way to a pedestrian. In a case different from the case where the vehicle 10 gives way to a pedestrian, the control unit 24 causes the road surface drawing unit 22 to draw a notification indication 20 in a warning color different from the safety color on the road surface. The safety color is an example of the first color, and the warning color is an example of the second color.

The control unit 24 determines whether a turn signal of the vehicle 10 is on based on the detection result of the turn signal sensor 40. When the turn signal sensor 40 detects that the turn signal switch is on, the control unit 24 determines that a turn signal is on. When the turn signal sensor 40 detects that the turn signal switch is off, the control unit 24 determines that a turn signal is off.

The safety color and the warning color are predetermined colors. For example, the safety color is blue or green, and the warning color is red or orange. These colors are merely by way of example, and the safety color and the warning color may be other colors.

As used herein, "the case where the vehicle 10 gives way to a pedestrian" is the case where the control unit 24 is aware based on the location information of the vehicle 10 that the vehicle 10 is passing through an intersection, the brake of the vehicle 10 is on, and the control unit 24 predicts that the vehicle 10 will stop in front of a crosswalk.

The control unit 24 determines whether the vehicle 10 is passing through an intersection based on the location information of the vehicle 10 and map information acquired by the location information acquisition unit 36. An intersection is a place where two or more roads meet or cross. Examples of an intersection include a three-way intersection (T-intersection or Y-intersection), a four-way intersection (crossroads), a five-way intersection, a six-way intersection, a seven-way intersection, a pedestrian scramble, and a roundabout. The map indicated by the map information shows roads reflecting their actual locations, sizes, and shapes, and crosswalks reflecting their actual locations, sizes, and shapes. The control unit 24 determines whether the vehicle 10 is passing through an intersection based on such map information and the location information of the vehicle 10.

The control unit 24 may determine whether the vehicle 10 is passing through an intersection by analyzing an image generated by capturing with the in-vehicle camera 41*a* and an image generated by capturing with a camera mounted on the road.

The control unit 24 predicts whether the vehicle 10 will stop in front of a crosswalk, based on the distance from the location of the vehicle 10 when the brake was turned on to the crosswalk in front of the vehicle 10, the speed of the vehicle 10 detected by the speed sensor 34 when the brake was turned on, and the deceleration G detected in response to the turning on of the brake.

The turning on of the brake is detected by the brake sensor 30. The crosswalk in front of the vehicle 10 is detected based on, for example, the location information of the vehicle 10 and the map information. The control unit 24 detects a crosswalk located in front of the vehicle 10 in the direction of travel of the vehicle 10 based on the current location of the vehicle 10, the direction of travel of the vehicle 10, and the locations of crosswalks indicated by the map information, and calculates the distance between the current location of the vehicle 10 and the detected crosswalk. The control unit 24 calculates the distance the vehicle 10 with the speed when the brake was turned on will travel before it stops, based on the deceleration G obtained by the turning on of the brake. When the distance the vehicle 10 will travel before it stops is equal to or less than the distance between the current location of the vehicle 10 and the crosswalk, the control unit 24 predicts that the vehicle 10 will stop in front of the crosswalk. When the distance the vehicle 10 will travel before it stops is larger than the distance between the current location of the vehicle 10 and the crosswalk, the control unit 24 predicts that the vehicle 10 will not stop in front of the crosswalk.

Another example of "the case where the vehicle 10 gives way to a pedestrian" is the case where the control unit 24 is aware from the in-vehicle camera 41*a* that the vehicle 10 is approaching a crosswalk, the brake of the vehicle 10 is on, and the control unit 24 predicts that the vehicle 10 will stop in front of the crosswalk.

The control unit 24 determines whether the vehicle 10 is approaching a crosswalk based on the location information of the vehicle 10 and map information acquired by the location information acquisition unit 36. For example, the control unit 24 determines whether there is a crosswalk in front of the vehicle 10 in the direction of travel of the vehicle 10 based on the location information of the vehicle 10 and the map information. The control unit 24 may determine whether there is a crosswalk in front of the vehicle 10 in the direction of travel of the vehicle 10 by analyzing an image generated by capturing with the in-vehicle camera 41*a*. When there is a crosswalk in front of the vehicle 10 in the direction of travel of the vehicle 10, the control unit 24 calculates the distance between the vehicle 10 and the crosswalk based on the location information of the vehicle 10 and the map information. The control unit 24 may calculate the distance between the vehicle 10 and the crosswalk by analyzing an image generated by capturing with the in-vehicle camera 41*a*. When there is a crosswalk in front of the vehicle 10 in the direction of travel of the vehicle 10 and the distance between the vehicle 10 and the crosswalk is equal to or less than a threshold value, the control unit 24 determines that the vehicle 10 is approaching the crosswalk.

Still another example of "the case where the vehicle 10 gives way to a pedestrian" is the case where the control unit 24 is aware from the in-vehicle camera 41*a* that there is a pedestrian in front of the vehicle 10, the brake of the vehicle 10 is on, and the control unit 24 predicts that the vehicle 10 will stop in front of the crosswalk.

The control unit 24 determines whether there is a pedestrian in front of the vehicle 10 within a predetermined distance from the vehicle 10 by analyzing an image generated by capturing with the in-vehicle camera 41*a*. When there is a pedestrian in front of the vehicle 10 within the predetermined distance from the vehicle 10, the control unit 24 determines that there is a pedestrian in front of the vehicle 10.

The driver's seat of the vehicle 10 is equipped with a switch for instructing to give way to a pedestrian. The control unit 24 may detect that the driver has decided to give way to a pedestrian, when the switch is depressed.

Hereinafter, embodiments will be described with reference to FIGS. 3 to 10. FIGS. 3 to 10 illustrate embodiments in which a notification indication 20 is drawn on the road surface.

As shown in FIGS. 3 to 10, the vehicle 10 is passing through an intersection 42. The intersection 42 is a four-way intersection of four roads. There is a crosswalk 44 on each road. The vehicle 10 is moving forward and turning left at the intersection 42, and there is a crosswalk 44 in front of the vehicle 10. There is a pedestrian 46 on a sidewalk on the front left side of the vehicle 10, and this pedestrian 46 is about to cross the crosswalk 44.

Figure 3:
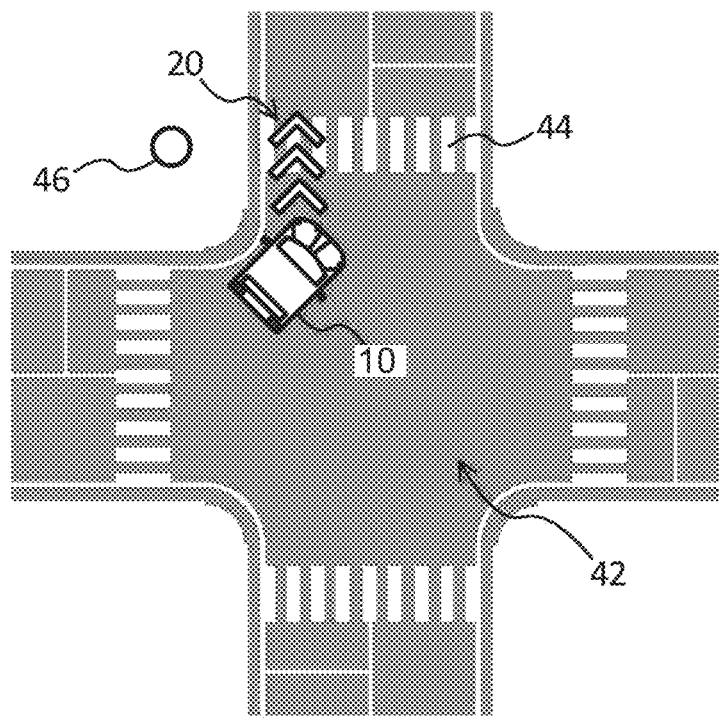
FIG. 3 illustrates an embodiment in which a notification indication is drawn in a safety color on a road surface.

When a turn signal of the vehicle 10 is on, the control unit 24 causes the road surface drawing unit 22 to draw a notification indication 20 in a safety color on the road surface in the case where the vehicle 10 gives way to the pedestrian 46. The notification indication 20 shown in FIG. 3 is drawn in a safety color (e.g., blue or green) on the road surface.

For example, the left turn signal of the vehicle 10 is on while the vehicle 10 is turning left. When the turn signal is on, the control unit 24 causes the road surface drawing unit 22 to draw a notification indication 20 in a safety color on the road surface in the case where the control unit 24 is aware based on the location information of the vehicle 10 that the vehicle 10 is passing through the intersection 42, the brake of the vehicle 10 is on, and the control unit 24 predicts that the vehicle 10 will stop in front of the crosswalk 44. When the left turn signal is on while the vehicle 10 is moving forward, the control unit 24 causes the road surface drawing unit 22 of the vehicle indication device 16*b* of the left headlight 12 to draw a notification indication 20 in a safety color on the road surface. As shown in FIG. 3, the notification indication 20 is thus drawn on the road surface on the front left side of the vehicle 10.

As another example, when the left turn signal of the vehicle 10 is on while the vehicle 10 is turning left, the control unit 24 may cause the road surface drawing unit 22 to draw a notification indication 20 in a safety color on the road surface on the front left side of the vehicle 10 in the case where the control unit 24 is aware from the in-vehicle camera 41*a* that the vehicle 10 is approaching the crosswalk 44, the brake of the vehicle 10 is on, and the control unit 24 predicts that the vehicle 10 will stop in front of the crosswalk 44.

As still another example, when the left turn signal of the vehicle 10 is on while the vehicle 10 is turning left, the control unit 24 may cause the road surface drawing unit 22 to draw a notification indication 20 in a safety color on the road surface on the front left side of the vehicle 10 in the case where the control unit 24 is aware from the in-vehicle camera 41*a* that there is a pedestrian 46 in front of the vehicle 10, the brake of the vehicle 10 is on, and the control unit 24 predicts that the vehicle 10 will stop in front of the crosswalk 44.

The control unit 24 may further cause the road surface drawing unit 22 of the vehicle indication device 16d of the left rear combination lamp 14 to draw a notification indication 20 in a safety color on the road surface. The notification indications 20 are thus drawn on the road surface on the front left side of the vehicle 10 and the road surface on the rear left side of the vehicle 10.

Figure 4:
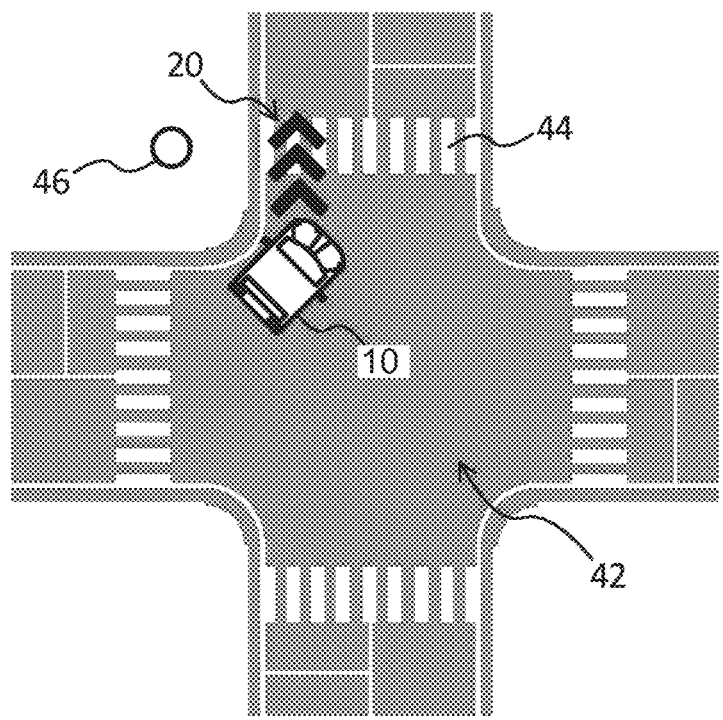
FIG. 4 illustrates an embodiment in which a notification indication is drawn in a warning color on a road surface.

In the case different from the case where the vehicle 10 gives way to the pedestrian 46, the control unit 24 causes the road surface drawing unit 22 to draw a notification indication 20 in a warning color on the road surface. For example, when a turn signal is on, the control unit 24 causes the road surface drawing unit 22 to draw a notification indication 20 in a warning color on the road surface on the front left side of the vehicle 10 as shown in FIG. 4 in the case where the brake of the vehicle 10 is off or in the case where the brake of the vehicle 10 is on and the control unit 24 predicts that the vehicle 10 will not stop in front of the crosswalk 44. The notification indication 20 shown in FIG. 4 is displayed in, for example, red or orange.

As described above, the color of the notification indication 20 that is drawn on the road surface when a turn signal is on is different between the case where the vehicle 10 gives way to the pedestrian 46 and the case different from the case where the vehicle 10 gives way to the pedestrian 46. The pedestrian 46 who sees the notification indication 20 can thus be notified of the timing the vehicle 10 moves and turns right or left. The pedestrian 46 can also be made aware of the decision of the driver of vehicle 10 on whether to give way to the pedestrian 46. For example, by drawing a notification indication 20 in a safety color, the pedestrian 46 can be notified that he or she may cross the road (crosswalk 44).

Figure 5:
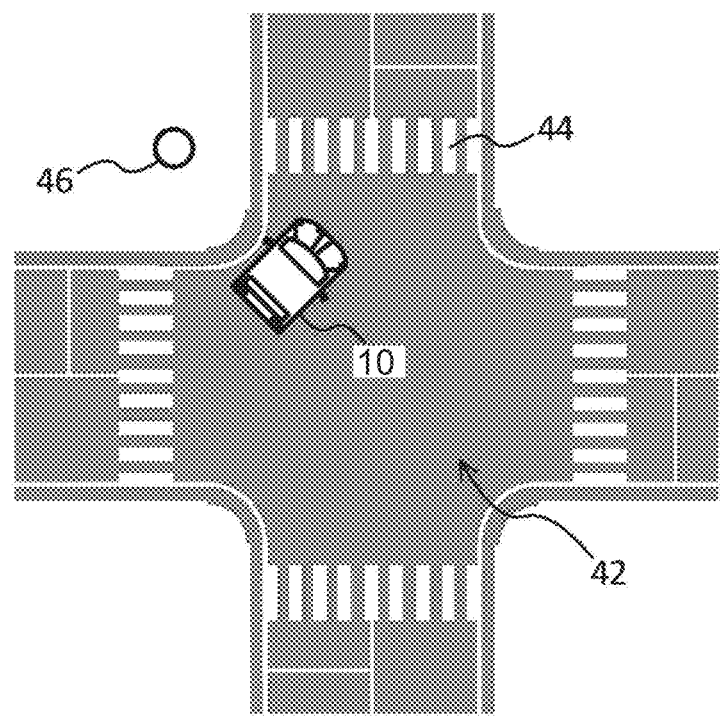
FIG. 5 illustrates an embodiment in which display of a notification indication is turned off.

When a turn signal is on, the control unit 24 may cause the road surface drawing unit 22 to turn off display of a notification indication 20 as shown in FIG. 5 in the case where the vehicle 10 gives way to the pedestrian 46. The pedestrian 46 may thus be made aware that the vehicle 10 gives way to the pedestrian 46.

When a turn signal is on, the control unit 24 may cause the road surface drawing unit 22 to turn off display of a notification indication 20 in the case where the brake is on, and may cause the road surface drawing unit 22 to draw a notification indication 20 on the road surface when the brake is off. This control may be performed in the opposite manner.

In the case different from the case where the vehicle 10 gives way to the pedestrian 46, the control unit 24 may cause the road surface drawing unit 22 to draw a notification indication 20 by sequential lighting. Sequential lighting means that the markings 20a, 20b, and 20c included in the notification indication 20 are drawn on the road surface so as to be displayed in sequence.

Figure 6:
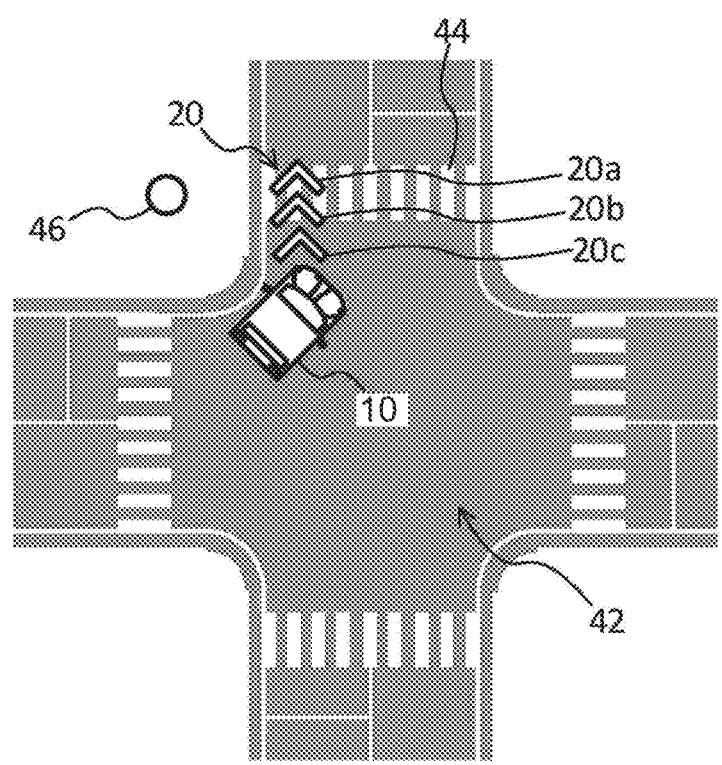
FIG. 6 illustrates an embodiment in which a sequential lighting notification indication is drawn on a road surface.

Sequential lighting will be described in detail with reference to FIG. 6. For example, the road surface drawing unit 22 draws markings on the road surface in sequence from the marking located close to the vehicle 10 to the marking located at the distal end of the notification indication 20, as controlled by the control unit 24. In the example shown in FIG. 6, the road surface drawing unit 22 first draws the marking 20c located close to the vehicle 10 on the road surface, then turns off the display of the marking 20c and draws the marking 20b on the road surface, and subsequently turns off the display of the marking 20b and draws the marking 20a on the road surface. It thus looks as if a marking gradually moves in the direction of travel of the vehicle 10. Therefore, the pedestrian 46 who sees the markings can be more clearly aware of the direction of travel of the vehicle 10.

Instead of sequential lighting, the control unit 24 may cause the notification indication 20 to blink. For example, the control unit 24 causes all or a part of the markings 20a, 20b, and 20c of the notification indication 20 to blink.

The control unit 24 may cause the road surface drawing unit 22 to draw a travel area (warning area) where the vehicle 10 will travel with the vehicle width. In this case, the control unit 24 may cause the road surface drawing unit 22 to draw the travel area and a non-travel area (safe area) where the vehicle 10 will not travel in different colors.

The control unit 24 estimates the direction in which the vehicle 10 travels based on the steering angle detected by the steering angle sensor 32, and calculates the distance the vehicle 10 will travel within a predetermined period of time (e.g., several seconds) based on the speed detected by the speed sensor 34. The control unit 24 determines a direction of travel area with respect to the position of the vehicle 10 based on the estimated direction of travel, and determines the size of the travel area (e.g., the length of the travel area in the direction of travel of the vehicle 10) based on the calculated distance.

Figure 7:
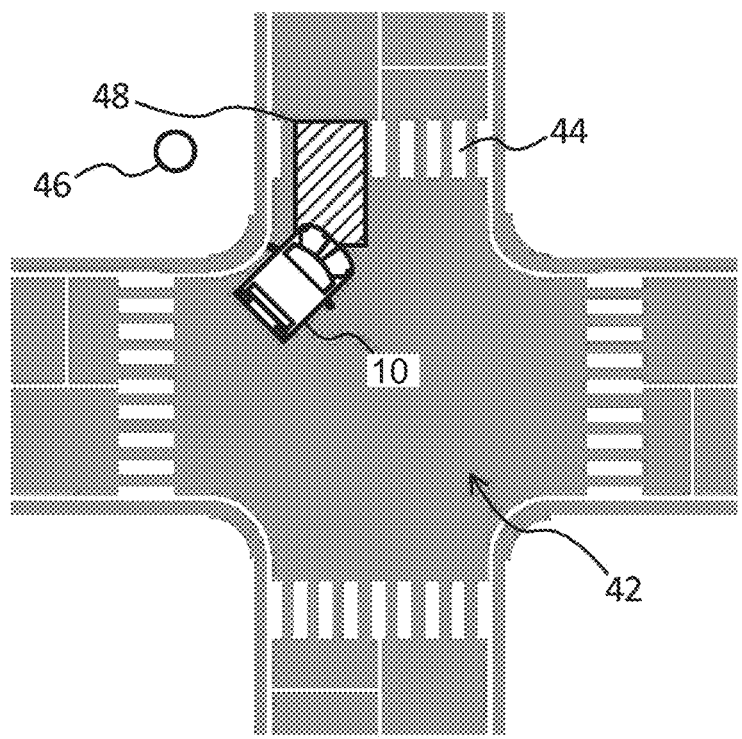
FIG. 7 illustrates an embodiment in which a notification indication of a travel area is drawn on a road surface.

FIG. 7 shows a travel area 48. Since the vehicle 10 is turning left while moving forward, the road surface drawing unit 22 draws the travel area 48 on the road surface on the front left side of the vehicle 10. The distance the vehicle 10 will travel within the predetermined period of time is calculated based on the speed of the vehicle 10, and this calculated distance corresponds to the length of the travel area 48 in the direction of travel of the vehicle 10. The width of the travel area 48 is equal to the width of the vehicle 10.

Figure 8:
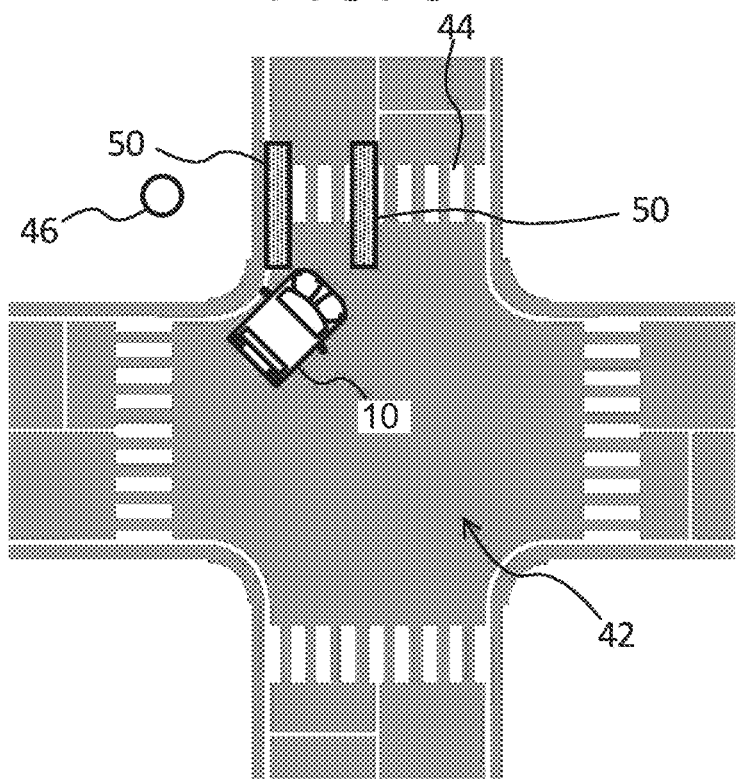
FIG. 8 illustrates an embodiment in which a notification indication of non-travel areas is drawn on a road surface.

FIG. 8 shows non-travel areas 50. For example, the non-travel areas 50 are certain areas located outside the travel area 48. The non-travel area 50 is not drawn in an area where the vehicle 10 is expected to travel based on the steering angle.

The road surface drawing unit 22 may draw both the travel area 48 and the non-travel areas 50 on the road surface or may draw either the travel area 48 or the non-travel areas 50 on the road surface, as controlled by the control unit 24.

The travel area 48 is drawn in a warning color such as red or orange, and the non-travel areas 50 are drawn in a safety color such as blue or green. The travel area 48 and the non-travel areas 50 may be drawn in colors other than these.

By drawing the travel area 48, the pedestrian 46 can be notified of the area where the vehicle 10 may travel. By drawing the non-travel areas 50, the pedestrian 46 can be notified of the areas where the vehicle 10 is unlikely to travel. By drawing the travel area 48 and the non-travel areas 50 in different colors, the pedestrian 46 can be clearly made aware of the difference between the travel and non-travel areas 48, 50.

The control unit 24 may change the range in which a notification indication is drawn according to the speed of the vehicle 10. For example, the road surface drawing unit 22 draws a notification indication on the road surface at a position farther from the position of the vehicle 10 when the speed of the vehicle 10 is high, and draws a notification indication on the road surface at a position closer to the position of the vehicle 10 when the speed of the vehicle 10 is low, as controlled by the control unit 24.

This control will be described with reference to FIGS. 9 and 10. For example, a first threshold value and a second threshold value are determined as threshold values of speed. The second threshold value is a value smaller than the first threshold value.

Figure 9:
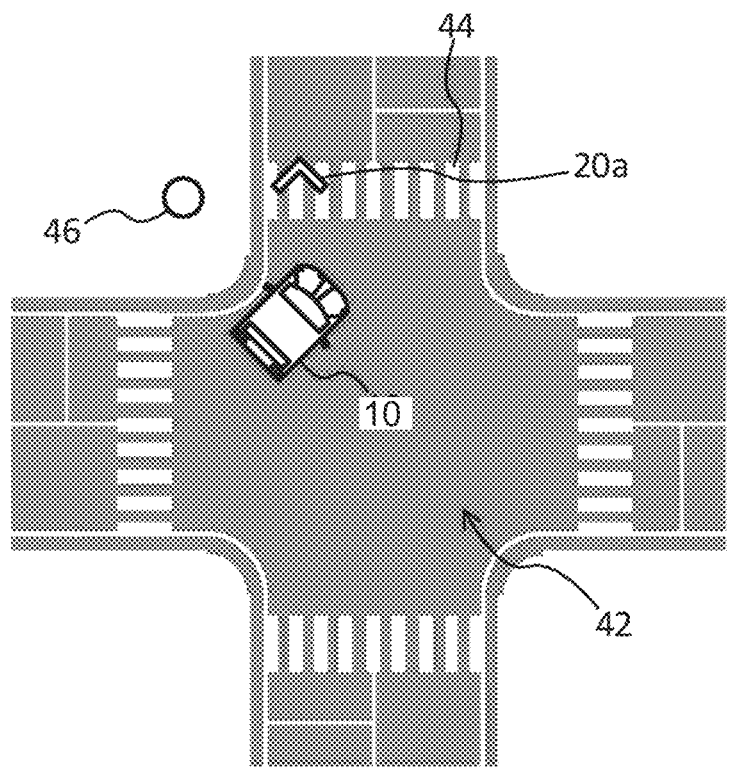
FIG. 9 illustrates an embodiment in which a notification indication is drawn on a road surface according to the speed.

When the speed is equal to or higher than the first threshold value, the road surface drawing unit 22 draws the marking 20a included in the notification indication 20 as shown in FIG. 9. The marking 20a is a marking located at the farthest position in the notification indication 20 from the vehicle 10, that is, a marking located at the distal end of the notification indication 20.

Figure 10:
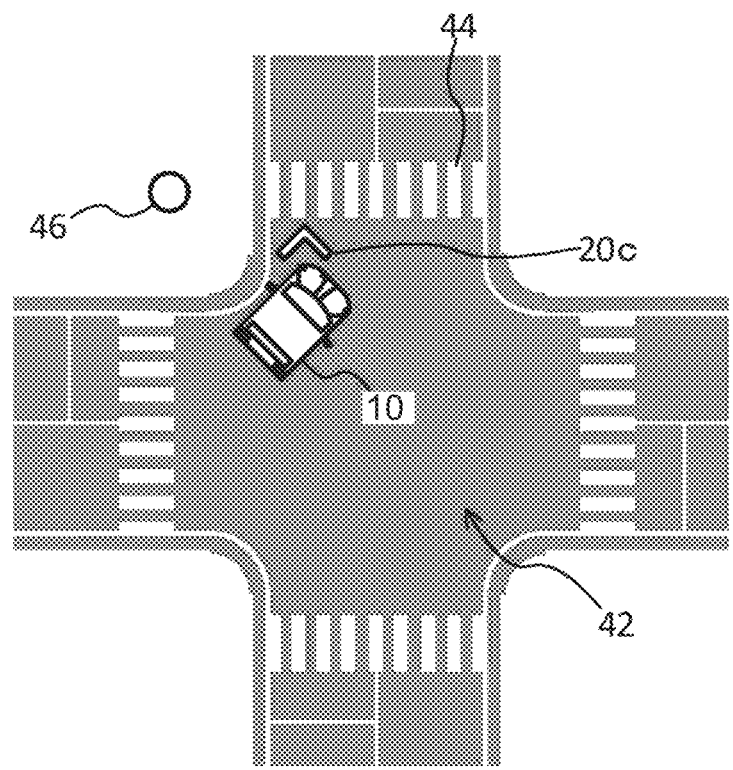
FIG. 10 illustrates an embodiment in which a notification indication is drawn on a road surface according to the speed.

When the speed is lower than the second threshold value, the road surface drawing unit 22 draws the marking 20c included in the notification indication 20 as shown in FIG. 10. The marking 20c is a marking located at the closest position in the notification indication 20 to the vehicle 10.

When the speed is equal to or higher than the second threshold value and lower than the first threshold value, the road surface drawing unit 22 draws the marking 20b included in the notification indication 20. The marking 20b is a marking located between the markings 20a and 20c in the notification indication 20.

As described above, when the speed of the vehicle 10 is high, a marking is drawn at a position farther from the position of the vehicle 10 than a position at which a marking is drawn when the speed of the vehicle 10 is low.

By changing the display position of the marking that is an example of the notification indication according to the speed of the vehicle 10, the pedestrian 46 can be notified of the position to which the vehicle 10 is going to move according to the speed. The pedestrian 46 can thus be made aware of a safe area and an unsafe area according to the speed.

In the examples shown in FIGS. 9 and 10, the position where the marking is drawn is changed among the three positions according to the speed of the vehicle 10. However, the position where the marking is drawn may be changed between two positions, or may be changed among more than three positions. The shape or size of the marking may be changed according to the speed.

As a control other than the control described above, the control unit 24 may cause the road surface drawing unit 22 to draw a notification indication when the starter switch sensor 26 detects that the starter switch of the vehicle 10 has been turned from off to on.

An example in which the vehicle 10 moves forward is described in the above embodiments. However, similar control may be performed when the vehicle 10 moves backward. When the vehicle 10 moves backward, the road surface drawing units 22 of the vehicle indication devices 16c, 16d of the rear combination lamps 14 draw a notification indication(s) on the road surface.

The functions of each unit of the vehicle indication device 16 mentioned above are implemented by, for example, cooperation between hardware and software. For example, the functions of the vehicle indication device 16 are implemented by a processor such as a central processing unit (CPU) reading and executing a program stored in a memory of the vehicle indication device 16. The program is stored in the memory via a recording medium such as a compact disc (CD) or a digital versatile disc (DVD), or via a communication path such as a network. The functions of each unit of the vehicle indication device 16 may be implemented by, for example, an application-specific integrated circuit (ASIC), a field-programmable gate array (FPGA), or other programmable logic device, or may be implemented by hardware such as an electronic circuit. For example, the control unit 24 may be an electronic control unit including a processor.

What is claimed is:

1. A vehicle indication device, comprising:
   a road surface drawing unit mounted on a vehicle and configured to draw one or more notification indications by light on a road surface in a direction of travel of the vehicle; and
   a control unit configured to, when a turn signal of the vehicle is on,
      in response to the vehicle giving way to a pedestrian, cause the road surface drawing unit to either draw the one or more notification indications in a first color on the road surface or turn off display of the one or more notification indications, and
      in response to the vehicle not giving way to a pedestrian, cause the road surface drawing unit to draw the one or more notification indications in a second color different from the first color on the road surface, wherein
   the control unit is configured to
      in response to the vehicle giving way to a pedestrian, determine using the first color in the one or more notification indications, and
      in response to the vehicle not giving way to a pedestrian, determine using the second color in the one or more notification indications.

2. The vehicle indication device according to claim 1, wherein the control unit is configured to determine that the vehicle gives way to a pedestrian, in response to that
   (i) the control unit is aware based on location information of the vehicle that the vehicle is passing through an intersection, is aware from a camera mounted on the vehicle that the vehicle is approaching a crosswalk, or is aware from the camera that there is a pedestrian in front of the vehicle,
   (ii) a brake of the vehicle is on, and
   (iii) the control unit predicts that the vehicle is going to stop in front of the crosswalk.

3. The vehicle indication device according to claim 1, wherein in response to the vehicle not giving way to a pedestrian, the control unit is configured to cause the road surface drawing unit to draw, in sequence, a plurality of notification indications as the one or more notification indications.

4. The vehicle indication device according to claim 3, wherein the control unit is configured to change a range in which the notification indications are drawn according to a speed of the vehicle.

5. The vehicle indication device according to claim 3, wherein
   the plurality of notification indications includes a first notification indication, a second notification indication, and a third notification indication, and
   in response to the vehicle not giving way to a pedestrian, the control unit is configured to cause the road surface drawing unit to draw the plurality of notification indications in sequence by:
      drawing the first notification indication located close to the vehicle on the road surface, then
      turning off display of the first notification indication and drawing the second notification indication between the first and third notification indications on the road surface, and then
      turning off display of the second notification indication and drawing the third notification indication on the road surface.

6. The vehicle indication device according to claim 1, wherein the control unit is further configured to cause the road surface drawing unit to draw, on the road surface, a travel area where the vehicle is going to travel, the travel area having a width equal to a width of the vehicle.

7. The vehicle indication device according to claim 6, wherein the control unit is further configured to cause the road surface drawing unit to draw, on the road surface, a non-travel area where the vehicle is not going to travel, the non-travel area being drawn outside the travel area, and the travel area and the non-travel area are drawn in different colors.

8. The vehicle indication device according to claim 7, wherein the control unit is configured to cause the road surface drawing unit to draw the travel area in the second color and the non-travel area in the first color.

9. The vehicle indication device according to claim 1, wherein the control unit is configured to change a range in which the one or more notification indications are drawn according to a speed of the vehicle.

10. The vehicle indication device according to claim 1, wherein the control unit is configured to, when the turn signal of the vehicle is on, in response to the vehicle giving way to a pedestrian, cause the road surface drawing unit to draw the one or more notification indications in the first color on the road surface.

11. The vehicle indication device according to claim 10, wherein in response to the vehicle not giving way to a pedestrian, the control unit is configured to cause the road surface drawing unit to cause the one or more notification indications to blink.

12. The vehicle indication device according to claim 1, wherein the control unit is configured to cause the road surface drawing unit to draw the one or more notification indications in response to a starter switch sensor of the vehicle detecting that a starter switch of the vehicle has been turned on from off.

13. The vehicle indication device according to claim 1, wherein the control unit is configured to, when the turn signal of the vehicle is on, in response to the vehicle giving way to a pedestrian, cause the road surface drawing unit to turn off the display of the one or more notification indications.

* * * * *